O. SCHUTZ.
PNEUMATIC TIRE.
APPLICATION FILED DEC. 20, 1916.

1,232,100.

Patented July 3, 1917.

Inventor
Otto Schutz

By his Attorneys
Hauff & Barland

UNITED STATES PATENT OFFICE.

OTTO SCHUTZ, OF NEW YORK, N. Y.

PNEUMATIC TIRE.

1,232,100.  Specification of Letters Patent.  Patented July 3, 1917.

Application filed December 20, 1916. Serial No. 137,952.

*To all whom it may concern:*

Be it known that I, OTTO SCHUTZ, a citizen of the United States, residing at New York, county of New York, State of N. Y., have invented new and useful Improvements in Pneumatic Tires, of which the following is a specification.

This invention relates essentially to a pneumatic tire in which an outer casing or shoe is provided with a resilient annular member arranged in the casing adjacent to the tread, and a flexible partition connected to the member made to divide the casing into a number of compartments.

The invention resides in the peculiar method of connecting the flexible annular partition with the member, so that when a pneumatic tire placed in one of the compartments is punctured, the tubing in the other compartment will expand and fill both compartments.

The invention is primarily designed to provide the shoe of a pneumatic tire with a flexible wire partition to divide the tire into equal compartments, the partition being adapted to swing over to the side of the casing when one of the pneumatic tubes arranged in a compartment is collapsed.

The novel features of the invention are more fully described in the following specification and claims and illustrated in the accompanying drawing in which:

In this drawing the letter $a$ designates an elastic casing which as shown is in the form of a shoe adapted to be clenched to a rim $b$ of a wheel. Arranged in the casing adjacent to the tread is a band or loop $c$ preferably formed of thin resilient material and adapted to centrifugally spring against the inner wall of the casing to prevent side shift and firmly hold it in place. In other words, the band hugs the inner surface of the tire adjacent to the tread, but it could be formed of spring wire and perform the same function.

Figure 1:
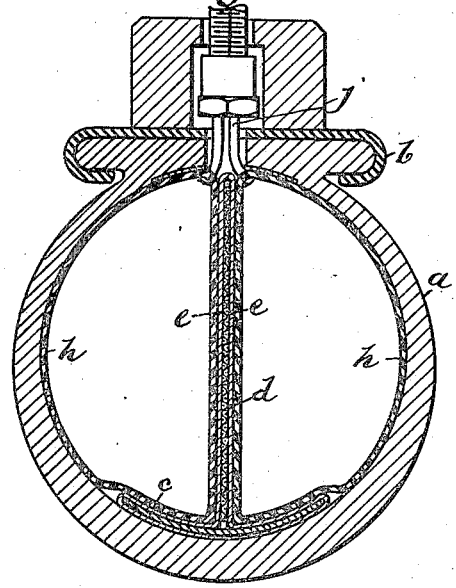
Figure 1 represents a transverse vertical section of a tire embodying this invention.
Figure 2:
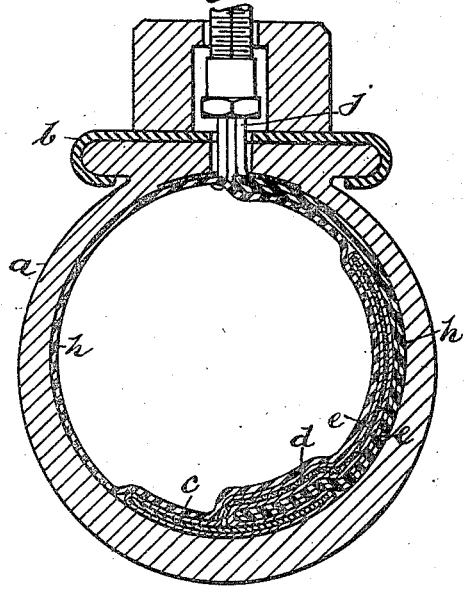
Fig. 2 is a similar view showing the partition in a different position.
Figure 3:
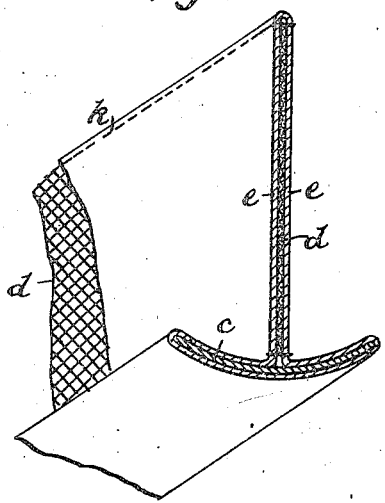
Fig. 3 is a perspective view of a flexible partition.

On the band is swingingly mounted a flexible partition consisting of a wire gauze member $d$ projecting radially from the band to divide the casing into a pair of annular compartments. The gauze member and the band are preferably covered with a fabric or elastic material $e$ which extends about the band and the gauze. As indicated in Fig. 3, one end of the gauze member terminates beyond the band, but is yieldingly connected to the band by the fabric.

Figure 4:
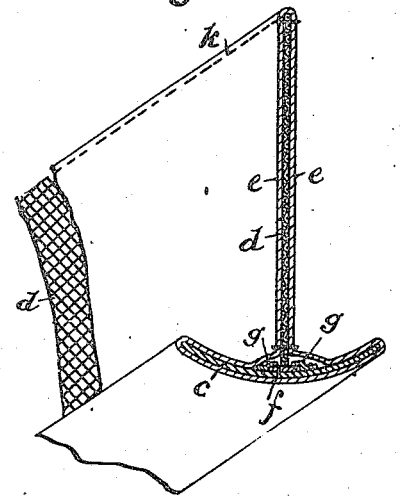
Fig. 4 is a similar view of a modification.

As shown in Fig. 4, the gauze member is swingingly connected to the band by extending the member and providing it with a T shaped head $f$ coacting with a strap $g$ secured to the band. When one of a pair of pneumatic tubes $h$ arranged in the compartments is punctured the flexible partition will swing over on to the collapsed tube along the inner wall of the casing. The air in the other tube then expands and the tube will occupy the space formerly filled by the said punctured tube. Each pneumatic tube can also be independently inflated by valves $j$, or both can be inflated simultaneously.

The fabric can be secured to the wire gauze by rows of stitches $k$ or it may be cemented thereto and the stitches omitted. It will be seen that when the partition is positioned on the collapsed tire, it will bend at the angle where it is joined to the band. The ends of the wire gauze and the band can be secured together in any well known way, for example, by welding, riveting or slot and stud fastening devices. The partition when in place in the casing practically forms a disk to circumferentially divide the casing into two equal annular chambers.

I claim:

1. In a pneumatic tire the combination with an outer clencher casing, of a resilient annular band arranged in the casing adjacent to the tread to centrifugally spring against the inner surface of the casing, a flexible wire gauze partition swingingly connected to the band to divide the casing into a number of annular compartments, a fabric covering the partition and the band.

2. In a pneumatic tire the combination with an outer clencher casing, of a resilient annular band arranged in the casing adjacent to the tread to centrifugally spring against the inner surface of the casing, a flexible disk shaped wire gauze partition swingingly connected to the band to divide the casing into a pair of compartments, a fabric covering the partition and yieldingly connected to the band.

In testimony whereof I have hereunto set my hand in the presence of two subscribing witnesses.

OTTO SCHUTZ.

Witnesses:
 WILLIAM MILLER,
 JOHN A. BERGSTROM.